(12) United States Patent
Wilson et al.

(10) Patent No.: US 11,261,111 B2
(45) Date of Patent: Mar. 1, 2022

(54) METHODS AND SYSTEMS FOR TREATING AN AQUEOUS SOLUTION

(71) Applicant: Battelle Energy Alliance, LLC, Idaho Falls, ID (US)

(72) Inventors: Aaron D. Wilson, Idaho Falls, ID (US); Daniel S. Wendt, Idaho Falls, ID (US); Christopher J. Orme, Firth, ID (US); Birendra Adhikari, Ammon, ID (US); Daniel M. Ginosar, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 17/040,271

(22) PCT Filed: Mar. 29, 2019

(86) PCT No.: PCT/US2019/024776
§ 371 (c)(1),
(2) Date: Sep. 22, 2020

(87) PCT Pub. No.: WO2019/191553
PCT Pub. Date: Oct. 3, 2019

(65) Prior Publication Data
US 2021/0017052 A1 Jan. 21, 2021

Related U.S. Application Data

(60) Provisional application No. 62/650,970, filed on Mar. 30, 2018, provisional application No. 62/693,081, filed on Jul. 2, 2018.

(51) Int. Cl.
*C02F 1/52* (2006.01)
*C02F 1/20* (2006.01)
*C02F 103/18* (2006.01)

(52) U.S. Cl.
CPC .............. *C02F 1/5272* (2013.01); *C02F 1/20* (2013.01); *C02F 2103/18* (2013.01); *C02F 2303/10* (2013.01)

(58) Field of Classification Search
CPC ......... C02F 1/04; C02F 1/5272; B01D 61/025
(Continued)

(56) References Cited

U.S. PATENT DOCUMENTS 3,415,747 A 12/1968 Glew
4,678,583 A 7/1987 Willson et al.
(Continued)

FOREIGN PATENT DOCUMENTS

JP 3415747 B2 6/2003
JP 2015-128740 A 7/2015
WO 2013/033483 A1 3/2013

OTHER PUBLICATIONS

International Search Report received for PCT Patent Application No. PCT/US19/024776, dated Jun. 19, 2019, 19 pages.
(Continued)

*Primary Examiner* — Nina Bhat
(74) *Attorney, Agent, or Firm* — TraskBritt

(57) ABSTRACT

A method of treating an aqueous solution comprises forming a treatment stream comprising a condensable material. The treatment stream is introduced to an aqueous solution comprising water and a solute to fractionally precipitate the solute out of the aqueous solution and form a solids stream comprising the solute and an aqueous liquid stream comprising at least one solute-depleted solution of the water and the condensable material. The condensable material of at least a portion of the aqueous liquid stream is separated from the water of the at least a portion of the aqueous liquid stream to at least partially reform the treatment stream and form an aqueous liquid product stream depleted in the
(Continued)

solute. Aqueous solution treatment systems and additional methods of treating an aqueous solution are also described.

20 Claims, 4 Drawing Sheets

(58) Field of Classification Search
USPC .......................................................... 210/712
See application file for complete search history.

(56) References Cited

U.S. PATENT DOCUMENTS

| | | | | |
|---|---|---|---|---|
| 7,560,029 B2* | 7/2009 | McGinnis | ............ | B01D 61/002 |
| | | | | 210/644 |
| 10,195,543 B2* | 2/2019 | Wilson | ............... | B01D 67/0093 |
| 10,975,477 B2* | 4/2021 | Lister | ..................... | B01D 53/62 |
| 11,020,706 B2* | 6/2021 | Briggs | ................. | C07C 211/05 |
| 2007/0207082 A1 | 9/2007 | Lee et al. | | |
| 2011/0297600 A1* | 12/2011 | Constantz | ................. | C02F 1/66 |
| | | | | 210/198.1 |
| 2014/0076810 A1* | 3/2014 | Jessop | ....................... | C08F 8/32 |
| | | | | 210/638 |
| 2015/0060368 A1* | 3/2015 | Keister | ................. | C01F 11/462 |
| | | | | 210/710 |
| 2015/0175447 A1* | 6/2015 | SenGupta | ................. | C02F 1/68 |
| | | | | 210/638 |
| 2018/0001226 A1 | 1/2018 | Sano et al. | | |

OTHER PUBLICATIONS

Written Opinion of the International Searching Authority for Application No. PCT/US19/24776, dated Jun. 19, 2020, 16 pages.

* cited by examiner

METHODS AND SYSTEMS FOR TREATING AN AQUEOUS SOLUTION

CROSS-REFERENCE TO RELATED APPLICATIONS

This application is a national phase entry under 35 U.S.C. § 371 of International Patent Application PCT/US2019/024776, filed Mar. 29, 2019, designating the United States of America and published in English as International Patent Publication WO2019/191553 A1 on Oct. 3, 2019, which claims the benefit of the filing date of U.S. Provisional Patent Application Ser. No. 62/650,970, filed Mar. 30, 2018, for "METHODS AND SYSTEMS FOR TREATING AN AQUEOUS SOLUTION," and of U.S. Provisional Patent Application Ser. No. 62/693,081, filed Jul. 2, 2018, for "METHODS AND SYSTEMS FOR TREATING AN AQUEOUS SOLUTION."

GOVERNMENT RIGHTS

This invention was made with government support under Contract No DE-AC07-05-ID14517 awarded by the United States Department of Energy. The government has certain rights in the invention.

TECHNICAL FIELD

The disclosure, in various embodiments, relates to methods and systems for treating an aqueous solution. More specifically, embodiments of the disclosure relate to methods and systems for removing a solute from an aqueous solution through fractional precipitation.

BACKGROUND

Current and emerging industries are anticipated to require intensification of water usage, which demands obtaining more water from existing water withdrawals. The more intensely water is used, the higher the total dissolved solids (TDS) in the resulting byproducts (e.g., byproduct brine). Brine disposal, in particular, is often about 80 percent of the cost for many water treatment processes that create brines exceeding regulatory TDS discharge limits. Conventional disposal pathways for waste brine include deep well injection or landfilling solids after water has been removed using a crystallizer or evaporation pond. However, crystallizers and evaporation ponds often suffer from energy inefficiencies and significant footprint and maintenance requirements. In addition, it is unlikely that current commercial TDS removal or concentration technologies, including those used for more dilute conditions, can be significantly enhanced to meet an aggressive levelized cost of water (LCOW) treatment needed for wide scale deployment of zero liquid discharge (ZLD) processes.

Accordingly, there is a need for new aqueous solution treatment systems and processes that are fundamentally different than conventional technologies.

BRIEF SUMMARY

Embodiments described herein include methods and systems for treating an aqueous solution. In accordance with one embodiment described herein, a method of treating an aqueous solution comprises forming a treatment stream comprising a condensable material. The treatment stream is introduced to an aqueous solution comprising water and a solute to fractionally precipitate the solute out of the aqueous solution and form a solids stream comprising the solute and an aqueous liquid stream comprising at least one solute-depleted solution of the water and the condensable material. The condensable material of at least a portion of the aqueous liquid stream is separated from the water of the at least a portion of the aqueous liquid stream to at least partially reform the treatment stream and form an aqueous liquid product stream depleted in the solute.

In additional embodiments, an aqueous solution treatment system comprises a source of an aqueous solution comprising water and a solute, a condensable material separation apparatus, and a contactor apparatus. The condensable material separation apparatus is configured to produce a treatment stream comprising a condensable material. The contactor apparatus is in fluid communication with the source of the aqueous solution and the condensable material separation apparatus, and is configured to interact the aqueous solution and the treatment stream with one another to fractionally precipitate the solute out of the aqueous solution and form a solids stream and one or more solute-depleted, aqueous liquid streams. The solids stream comprises the solute. The one or more solute-depleted, aqueous liquid streams comprise at least one solution of the water and the condensable material.

In yet additional embodiments, a method of treating an aqueous solution comprises forming a first treatment stream comprising condensable material. A second treatment stream comprising additional condensable material is formed. The first treatment stream is introduced to an aqueous solution comprising water, an organic liquid, and a dissolved solid to form a first liquid stream and a second liquid stream. The first liquid stream comprises the organic liquid and the first condensable material. The second liquid stream comprises the water and the dissolved solid. The first condensable material of the first liquid stream is separated from the organic liquid of the first liquid stream to at least partially reform the first treatment stream and form a first liquid product stream comprising the organic liquid. The second treatment stream is introduced to the second liquid stream to fractionally precipitate the dissolved solid out of solution and form a solids stream and a third liquid stream. The solids stream comprises the precipitated solid. The third liquid stream comprises the water and the second condensable material. The second condensable material of the third liquid stream is separated from the water of the third liquid stream to at least partially reform the second treatment stream and form a second liquid product stream comprising the water.

In further embodiments, an aqueous solution treatment system comprises a source of an aqueous solution comprising water, an organic liquid, and a dissolved solid; a first condensable material separation apparatus; a first contactor apparatus, a second condensable material separation apparatus; and a second contactor apparatus. The first condensable material separation apparatus is configured to produce a first treatment stream comprising condensable material. The first contactor apparatus is in fluid communication with the source of the aqueous solution and the first condensable material separation apparatus, and is configured to interact the aqueous solution and the first treatment stream with one another to form a first liquid stream and a second liquid stream. The first liquid stream comprises the organic liquid and the condensable material. The second liquid stream comprises the water and the dissolved solid. The second condensable material separation apparatus is configured to produce a second treatment stream comprising additional condensable material. The second contactor apparatus is in fluid communication with the first contactor apparatus and the second condensable material separation apparatus, and is configured to interact the second liquid stream and the second treatment stream with one another to fractionally precipitate the dissolved solid out of solution and form a solids stream and a second liquid product stream. The solids stream comprises the precipitated solid. The second liquid product stream comprises the water.

DETAILED DESCRIPTION

Figure 1:
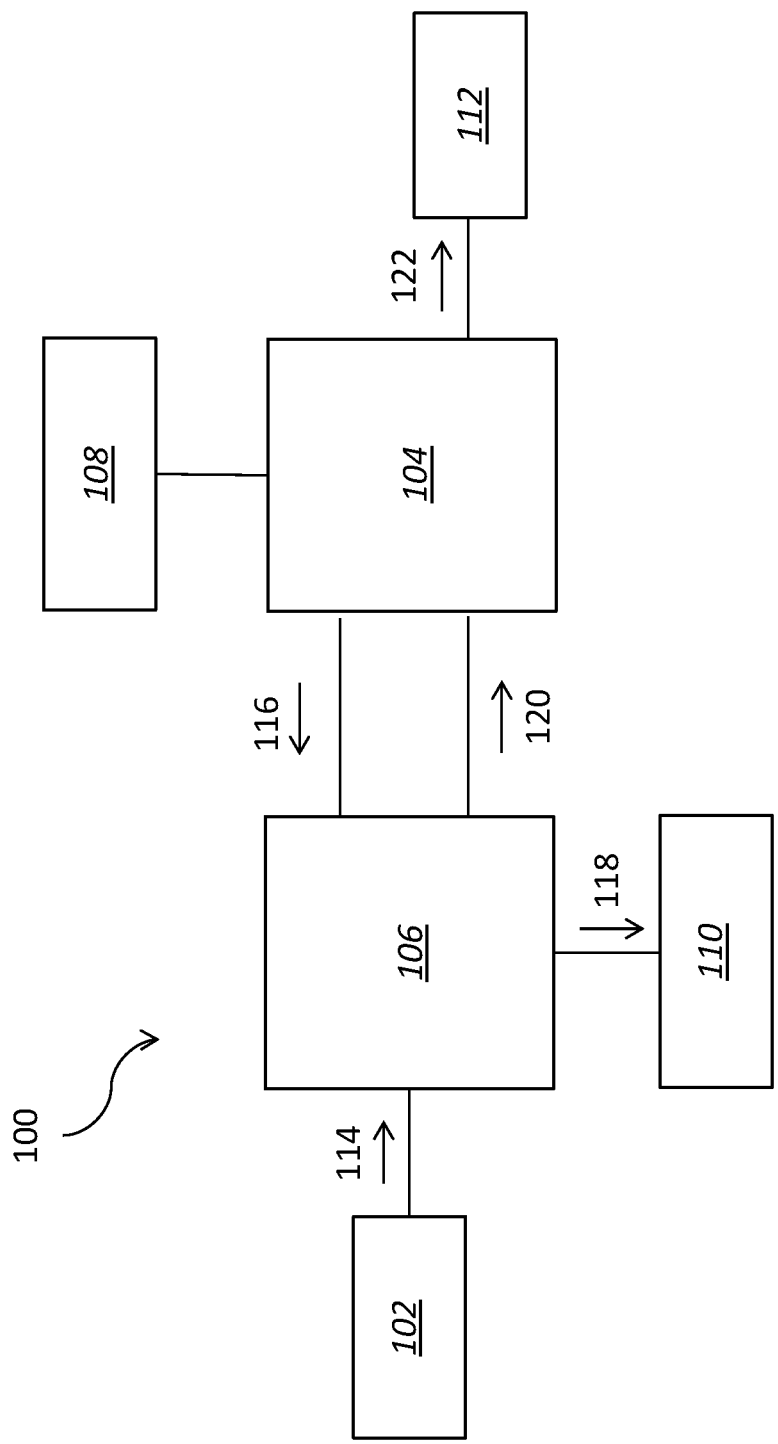
FIG. 1 is a simplified schematic view of an aqueous solution treatment system, in accordance with an embodiment of the disclosure.

The following description provides specific details, such as stream compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the application are for illustrative purposes only, and are not meant to be actual views of any particular material, device, or system. Moreover, elements in common between figures may retain the same numerical designation.

As used herein, the terms "comprising," "including," "containing," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "solution" means and includes a solution of solute in solvent, a suspension of solute in solvent, an emulsion of solute in solvent, or combinations thereof. Since a person of ordinary skill in the art will recognize whether a particular reference describes a solution, a suspension, an emulsion or a combination thereof from the context, for the purposes of readability and claiming the invention, the term "solution" means a solution, a suspension, an emulsion, or a combination thereof.

An embodiment of the disclosure will now be described with reference to FIG. 1, which schematically illustrates an aqueous solution treatment system 100. The aqueous solution treatment system 100 may be used to remove one or more solutes (e.g., dissolved solids) from an aqueous solution through a fractional precipitation (also commonly referred to as "fractional crystallization") process employing one or more condensable materials. As used herein, the term "condensable material" refers to a material that is a gas under ambient conditions and a liquid at elevated pressures. A condensable material can be provided (e.g., introduced, delivered) as a gas or as a liquid. As shown in FIG. 1, the aqueous solution treatment system 100 may include at least one aqueous solution source 102, at least one condensable material separation apparatus 104 (e.g., degasser), and at least one contactor apparatus 106 (e.g., gas-liquid contactor, liquid-liquid contactor) in fluid communication with the aqueous solution source 102 and the condensable material separation apparatus 104. The aqueous solution treatment system 100 may also include one or more of at least one energy source 108 operatively associated with the condensable material separation apparatus 104, at least one solids containment vessel 110 downstream of the contactor apparatus 106, and at least one liquid containment vessel 212 downstream of the condensable material separation apparatus 104.

During use and operation, the contactor apparatus 106 receives at least one aqueous solution stream 114 from the aqueous solution source 102, and at least one treatment stream 116 from the condensable material separation apparatus 104. The aqueous solution stream 114 includes an aqueous solution of water and at least one solute. The treatment stream 116 includes at least one phase state (e.g., a gaseous phase, a liquid phase) of at least one condensable material. In the contactor apparatus 106, the treatment stream 116 interacts with the aqueous solution stream 114 to fractionally precipitate the solute of the aqueous solution stream 114 out of solution and form at least one solids effluent stream 118 and at least one liquid effluent stream 120. The solids effluent stream 118 is rich in the solute of the aqueous solution stream 114. The liquid effluent stream 120 is depleted in the solute of the aqueous solution stream 114 and is rich in the water of the aqueous solution stream 114 and the condensable material of the treatment stream 116.

The liquid effluent stream 120 may comprise a single (e.g., only one) stream including a single phase (e.g., a single liquid phase comprising a solution of water and the condensable material), may comprise a single stream including multiple (e.g., more than one) phases (e.g., an aqueous liquid phase comprising a first solution rich in water, and polar organic liquid phase comprising a second solution rich in the liquid phase of the condensable material), or may comprise multiple streams each individually including a single phase (e.g., a single liquid phase comprising a solution of water and the condensable material; a single aqueous liquid phase rich in water; a single polar organic liquid phase rich in the condensable material) or multiple phases (e.g., an aqueous liquid phase rich in water, and a polar organic liquid phase rich in the condensable material).

At least a portion of the liquid effluent stream(s) 120 (e.g., an entirety of the liquid effluent stream(s) 120; an aqueous liquid phase of the liquid effluent stream(s) 120 rich in water; a polar organic liquid phase of the liquid effluent stream(s) 120 rich in the liquid phase of the condensable material) is directed into the condensable material separation apparatus 104, wherein a change of environmental conditions (e.g., one or more of a change in temperature, pressure, and material exposure(s)) may be effectuated to separate the condensable material from the water. The condensable material separation apparatus 104 may facilitate the at least partial reformation of treatment stream 116, and may also form an aqueous product stream 122 rich in water and depleted in the condensable material. The condensable material separation apparatus 104 may include one or more energy recovery devices (e.g., heat exchangers), and/or one or more pressure devices (e.g., pressure exchange devices) configured and operated to pressurize the treatment stream 116.

With the description provided below, it will be readily apparent to one of ordinary skill in the art that the systems and methods described herein may be used in various systems. In other words, the systems and methods of the disclosure may be used whenever it is desired to remove dissolved solids from an aqueous solution.

With continued reference to FIG. 1, the aqueous solution source 102 comprises at least one device, structure, or apparatus configured and operated to store and/or produce the aqueous solution stream 114. As a non-limiting example, the aqueous solution source 102 may comprise a storage vessel (e.g., a tank). As another non-limiting example, the aqueous solution source 102 may comprise a heat rejection apparatus (e.g., a cooling tower) of a water treatment system (e.g., a wastewater treatment system, a desalination system, etc.).

The aqueous solution stream 114 may be formed of and include water and at least one solute. The solute may comprise one or more of a homogenous material and a heterogeneous material. Non-limiting examples of homogenous materials include inorganic materials (e.g., water soluble minerals; water soluble compounds, such as salts; scalants, such as calcium carbonate, calcium sulfate, barium sulfate, strontium sulfate, calcium fluoride, iron, colloidal materials, sodium metasilicate, sodium orthosilicate, sodium pyrosilicate, other sodium silicates, and other water-soluble silicates), organic materials (e.g., pharmaceuticals, plasticizers, solvents, industrial chemicals, and organics found in produced water), and inorganic/organic hybrid materials (e.g., coordination complexes, and organometallic complexes such as dimethyl mercury). Non-limiting examples of heterogeneous materials include algae, microbes, small particulate matter, undissolved sewage material, nanoparticles, polymers, and food product solution materials, such as fruit juices and milk solutions. The solute may be present as a contaminant or impurity of the water, or the water may be present as a contaminant or impurity of the solute. By way of non-limiting example, the aqueous solution stream 114 may include one or more of an aqueous saline solution, ocean water, brine, brackish water, mineralized water, industrial waste water, produced water, mining waste (e.g., a potash solution, a gypsum solution, a lithium salt solution), a food product solution (e.g., a fruit juice solution, milk solution), an acid solution, a base solution, a synthetic fermentation broth, algal growth media, a microbial solution, landfill leachate, a radioactive material solution, and a toxic material solution. In some embodiments, the aqueous solution stream 114 comprises brine. In additional embodiments, a total dissolved solids (TDS) content of the aqueous solution stream 114 is greater than or equal to about 35,000 parts per million (ppm) (e.g., within a range of from about 35,000 ppm to about 75,000 ppm; greater than or equal to about 40,000 ppm). The aqueous solution treatment system 100 may, for example, be employed to soften the aqueous solution stream 114 by fractionally precipitating at least a portion (e.g., at least a majority, substantially all) of the solute(s) (e.g., scalant(s)) out of solution, as described in further detail below.

The condensable material separation apparatus 104 may comprise at least one apparatus configured and operated to produce the treatment stream 116, and to receive and act upon one or more portions of the liquid effluent stream(s) 120. In some embodiments, the condensable material separation apparatus 104 comprises a degassing apparatus. The condensable material separation apparatus 104 may produce the treatment stream 116 by exposing the one or more portions of the liquid effluent stream(s) 120 to a change of reaction conditions (e.g., a change in temperature, pressure, and/or material exposure) facilitating the release of one or more gases to form the treatment stream 116 and the aqueous product stream 122, as described in further detail below.

The treatment stream 116 may be formed of and include one or more phase states (e.g., a gas phase, a liquid phase, a combination thereof) of at least one condensable material capable of interacting with the aqueous solution stream 114 within the contactor apparatus 106 to fractionally precipitate the solute of the aqueous solution stream 114 out of solution and form the solids effluent stream 118 and the liquid effluent stream(s) 120. In some embodiments, the treatment stream 116 comprises a chemical compound capable of being dissolved in or dissolving water of the aqueous solution stream 114 under the operating conditions (e.g., temperature, pressure) of the contactor apparatus 106 so as to modify the activity of the water and fractionally precipitate the solute out of solution.

The treatment stream 116 may, for example, comprise one or more of a gaseous phase and a liquid phase of at least one condensable material that is substantially soluble with water of the aqueous solution stream 114 under the operating conditions (e.g., pressures, temperatures) of the contactor apparatus 106. The condensable material may be a gas at ambient pressure (about 1 atm) and ambient temperatures (from about −89.2° C. to about 70.1° C.), that that phase changes to a liquid at elevated pressures (e.g., from about 2 atm to about 100 atm) at the ambient temperatures (from about −89.2° C. to about 70.1° C.). By way of non-limiting example, the condensable material may comprise one or more dimethyl ether (DME), disiloxane, carbon dioxide, nitrous oxide, an alkane (e.g., ethane, propane, butane), an alkene (e.g., an isomer of butene), an haloalkane (e.g., chloromethane, difluoroethane), and an common refrigerant. In some embodiments, the treatment stream 116 may comprises a hydrophilic condensable material, such as dimethyl ether (DME). The condensable material (e.g., hydrophilic condensable material) of the treatment stream 116 may at least partially separate the water of the aqueous solution stream 114 from the solute of the aqueous solution stream 114, forming one or more bulk liquid phases rich in one or more of water and the compound, which are then removed from the contactor apparatus 106 in the liquid effluent stream(s) 120. In some such embodiments, the treatment stream 116 is substantially free of materials other than the condensable material(s).

The treatment stream 116 may include any amount of the condensable material able to fractionally precipitate at least a majority (e.g., greater than 50 percent, such as greater than or equal to about 60 percent, greater than or equal to about 70 percent, greater than or equal to about 80 percent, greater than or equal to about 90 percent, greater than or equal to about 95 percent) of the solute of the aqueous solution stream 114 out of solution under the operating conditions (e.g., temperatures, pressures, flow rates, residence times) of the contactor apparatus 106. In some embodiments, a concentration of the condensable material in the treatment stream 116 is tailored (e.g., selected, controlled) to fractionally precipitate at least 90 percent of the solute of the aqueous solution stream 114 out of solution under the operating conditions of the contactor apparatus 106. The separation of the solute(s) of the aqueous solution stream 114 from the water of the aqueous solution stream 114 using the treatment stream 116 may be performed selectively at least partially based on the solubility characteristics of the solute(s) under the imposed fractional precipitation conditions. As such, different solutes may be separated from the water (and, optionally, from one another if multiple solutes are present in the aqueous solution stream 114) under different operating conditions of the contactor apparatus 106 to yield desired material compositions (e.g., including desired species and concentrations of solids) in the solids effluent stream 118.

A single (e.g., only one) treatment stream 116 may be may be directed into the contactor apparatus 106, or multiple (e.g., more than one) treatment stream 116 may be directed into contactor apparatus 106. If multiple treatment streams 116 are directed into the contactor apparatus 106, each of the treatment streams 116 may exhibit substantially the same properties (e.g., the same material composition, including the same species, amount, and phase state of condensable material and additional materials (if any); the same temperature; the same pressure; the same flow rate; etc.), or at least one of the treatment streams 116 may exhibit one or more different properties (e.g., one or more of a different material composition, such a different species, a different amount, and/or a different phase state of one or more of the condensable material and the additional materials (if any); a different temperature; a different pressure; a different flow rate; etc.) than at least one other of the treatment streams 116. Each of the multiple treatment streams 116 may individually comprise a single (e.g., only one) material (e.g., a condensable material substantially soluble with the water of the aqueous solution stream 114, such as a hydrophilic condensable gas), or at least one of the multiple treatment streams 116 may comprise a single material and at least one other of the treatment streams 116 may comprise a mixture of materials. At least some of the multiple treatment streams 116 may be combined with one another prior to being directed into the contactor apparatus 106, and/or at least some of the multiple treatment streams 116 may be directed into the contactor apparatus 106 separately (e.g., discretely, individually, etc.) and combined with one another within the contactor apparatus 106. If at least some of the multiple treatment streams 116 are separately directed into the contactor apparatus 106, the multiple treatment streams 116 may be directed into the contactor apparatus 106 simultaneously, non-simultaneously, or a combination thereof. In some embodiments, a single treatment stream 116 comprising a mixture of materials is directed into the contactor apparatus 106.

The aqueous solution stream 114 and the treatment stream 116 may each individually exhibit a temperature, a pressure, and a flow rate facilitating the fractional precipitation of the solute of the aqueous solution stream 114 out of solution within the contactor apparatus 106 to form the solids effluent stream 118 and the liquid effluent stream(s) 120. The temperature(s), pressure(s), and flow rate(s) of the aqueous solution stream 114 and the treatment stream 116 may be selected relative to one another and at least partially based on the components of the aqueous solution stream 114 (e.g., solute(s), additional material(s)) and the treatment stream 116 (e.g., condensable material(s) and additive(s) (if any), such as acid gas(es), thereof), and on the configuration of the contactor apparatus 106 (e.g., including the sizes, shapes, material compositions, and arrangements of components thereof). In some embodiments, the temperature(s), pressure(s), and flow rate(s) of the aqueous solution stream 114 and the treatment stream 116 are controlled (e.g., selected and/or adjusted) to fractionally precipitate at least 90 percent of the solute of the aqueous solution stream 114 out of solution under the operating conditions of the contactor apparatus 106.

With continued reference to FIG. 1, the contactor apparatus 106 comprises at least one device, structure, or apparatus configured and operated to form the solids effluent stream(s) 118 and the liquid effluent stream(s) 120 from components of the aqueous solution stream 114 and the treatment stream 116. As a non-limiting example, the contactor apparatus 106 may comprise a spray chamber apparatus configured to form and direct discrete portions (e.g., drops, aerosol) of one or more (e.g., each) of the treatment stream 116 and the aqueous solution stream 114 to facilitate interactions between components of the aqueous solution stream 114 and the treatment stream 116. As another non-limiting example, the contactor apparatus 106 may comprise a bubbler apparatus (e.g., a gas bubbler apparatus, a liquid bubbler apparatus) configured and operated to form and direct discrete portions (e.g., gas bubbles, liquid droplets) of the treatment stream 116 through the aqueous solution stream 114. As an additional non-limiting example, the contactor apparatus 106 may comprise a diffusion membrane apparatus (e.g., a gas-liquid diffusion membrane apparatus, a liquid-liquid diffusion membrane apparatus) configured and operated to diffuse molecules of the component(s) of the treatment stream 116 into the aqueous solution stream 114. In some embodiments, the contactor apparatus 106 includes a sonication device configured and operated to facilitate or enhance interactions between components of the aqueous solution stream 114 and the treatment stream 116.

The solids effluent stream 118 rich in solutes of the aqueous solution stream 114 fractionally precipitated out of solution in the contactor apparatus 106 using the treatment stream 116 may exit the contactor apparatus 106, and may be utilized or disposed of as desired. As shown in FIG. 1, in some embodiments, the solids effluent stream 118 is directed into the solids containment vessel 110 for storage and/or further processing. The solids containment vessel 110 may comprise any device, structure, or apparatus configured and operated to at least temporarily hold the components (e.g., precipitated solute(s), solvent(s)) of the solids effluent stream 118. In some embodiments, the solids containment vessel 110 is also configured and operated to remove one or more liquid components (e.g., solvent(s)) of the solids effluent stream 118 relative to one or more solid components (e.g., precipitated solute(s)) of the solids effluent stream 118. As a non-limiting example, the solids containment vessel 110 may comprise an evaporation vessel configured and operated to remove (e.g., evaporate) water and/or other solvents (e.g., organic solvents) present in the solids effluent stream 118 from the precipitated solutes of the solids effluent stream 118.

The liquid effluent stream(s) 120 rich in the water of the aqueous solution stream 114 and the condensable material of the treatment stream 116 exit the contactor apparatus 106, and at least a portion thereof (e.g., an entirety thereof; an aqueous liquid phase thereof; a polar organic liquid phase thereof) is directed into the condensable material separation apparatus 104 for further processing. Within the condensable material separation apparatus 104, the received portion(s) of the liquid effluent stream 120 are subjected to a change of change of conditions (e.g., a temperature change, a pressure change, and/or a material exposure change) to at least partially (e.g., substantially) reform the treatment stream 116 and form the aqueous product stream 122. As a non-limiting example, if the liquid effluent stream(s) 120 comprises a solution (e.g., a pressurized solution) of water and a gaseous state of a condensable material (e.g., a hydrophilic condensable gas) soluble with the solvent under pressure, the liquid effluent stream 120 may subjected to a change of conditions facilitating the release of the condensable material (e.g., the hydrophilic condensable gas) from the solution to at least partially reform the treatment stream 116 including the condensable material, and to form the aqueous product stream 122 rich in water. Subjecting the received portion(s) of the liquid effluent stream(s) 120 to a change of conditions may, for example, be effectuated by exposing the received portion(s) of the liquid effluent stream(s) 120 to one or more of elevated temperature and reduced pressure. In some embodiments, the received portion(s) of the liquid effluent stream 120 are exposed to elevated temperatures within the condensable material separation apparatus 104 using energy (e.g., thermal energy, electricity) supplied from an energy source 108. The energy source 108 may, for example, comprise one or more of a device, structure, or apparatus configured and operated to exploit one or more of solar thermal energy (e.g., a solar pond; a concentrated solar power apparatus, such as one or more of parabolic tough, a solar power tower, an enclosed tough, a Fresnel reflector, a dish Stirling, etc.), geothermal energy, nuclear energy, combustion-based energy, and waste heat (e.g., heat generated from one or more of an engine, a chemical process, and a phase change process). In additional embodiments, the received portion(s) of the liquid effluent stream(s) 120 are expanded (e.g., by way of one or more of an expansion turbine and an expansion valve) to reduce the pressure thereof and at least partially reform the treatment stream 116 and form the aqueous product stream 122.

The aqueous product stream 122 formed within the condensable material separation apparatus 104 is rich in water of the aqueous solution stream 114 and depleted in the solute of the aqueous solution stream 114. The aqueous product stream 122 may be utilized or disposed of as desired. As shown in FIG. 1, in some embodiments, the aqueous product stream 122 is directed into the liquid containment vessel 212 for storage and/or further processing. The liquid containment vessel 212 may comprise any device, structure, or apparatus configured and operated to at least temporarily hold the components (e.g., solvent(s), trace additional material(s)) of the aqueous product stream 122.

Figure 2:
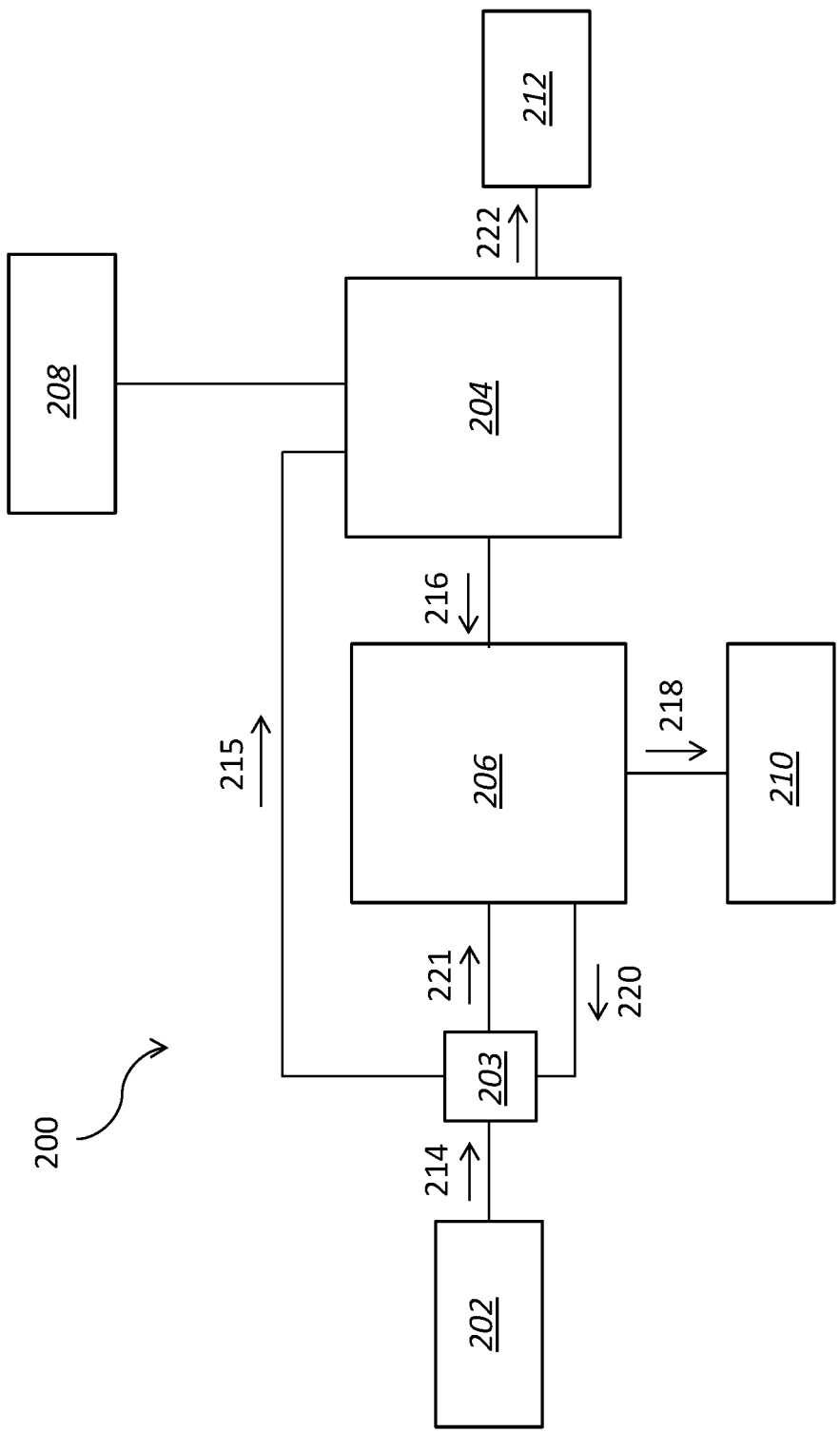
FIG. 2 is a simplified schematic view of an aqueous solution treatment system, in accordance with an additional embodiment of the disclosure.
Figure 3:
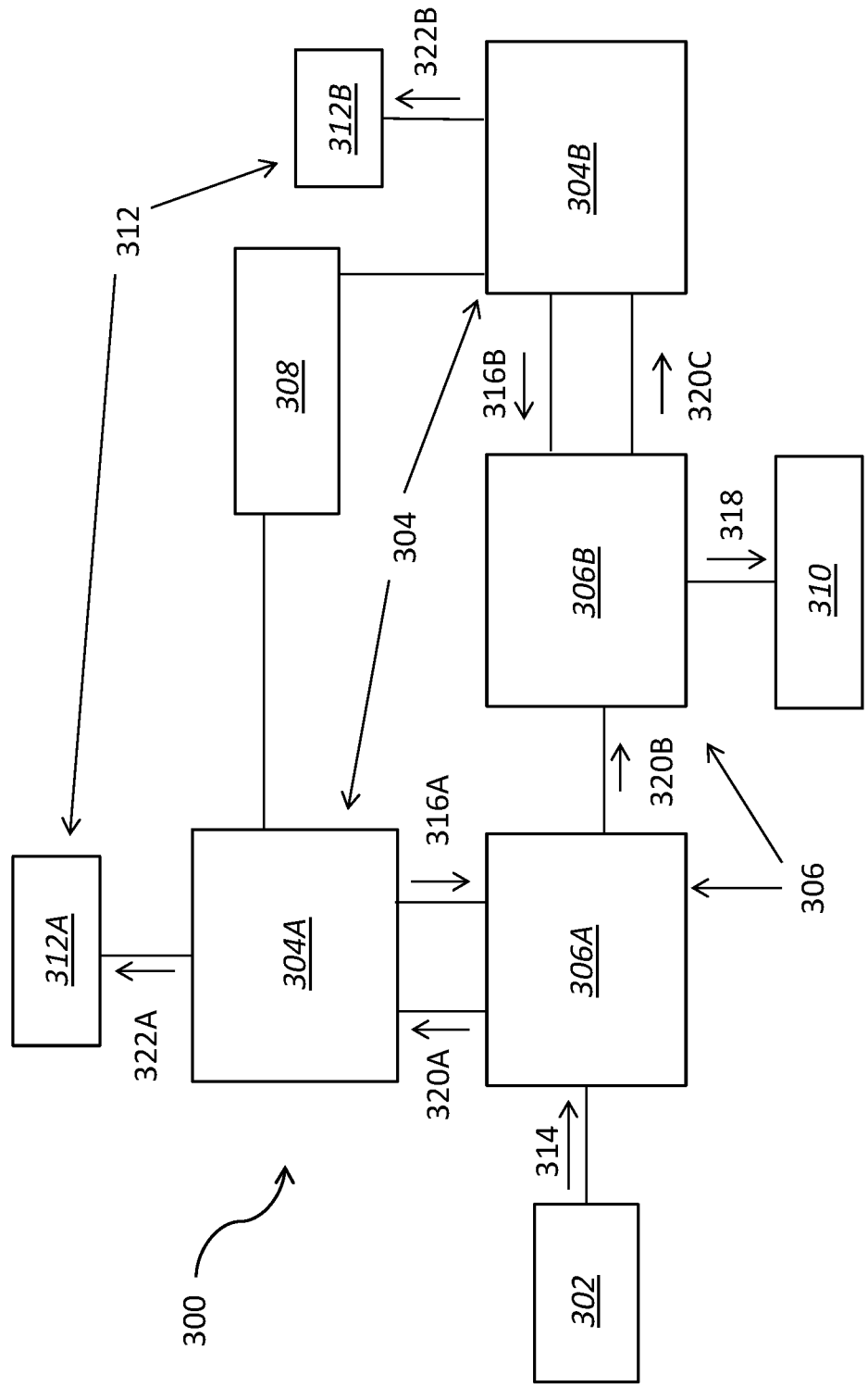
FIG. 3 is a simplified schematic view of an aqueous solution treatment system, in accordance with a further embodiment of the disclosure.
Figure 4:
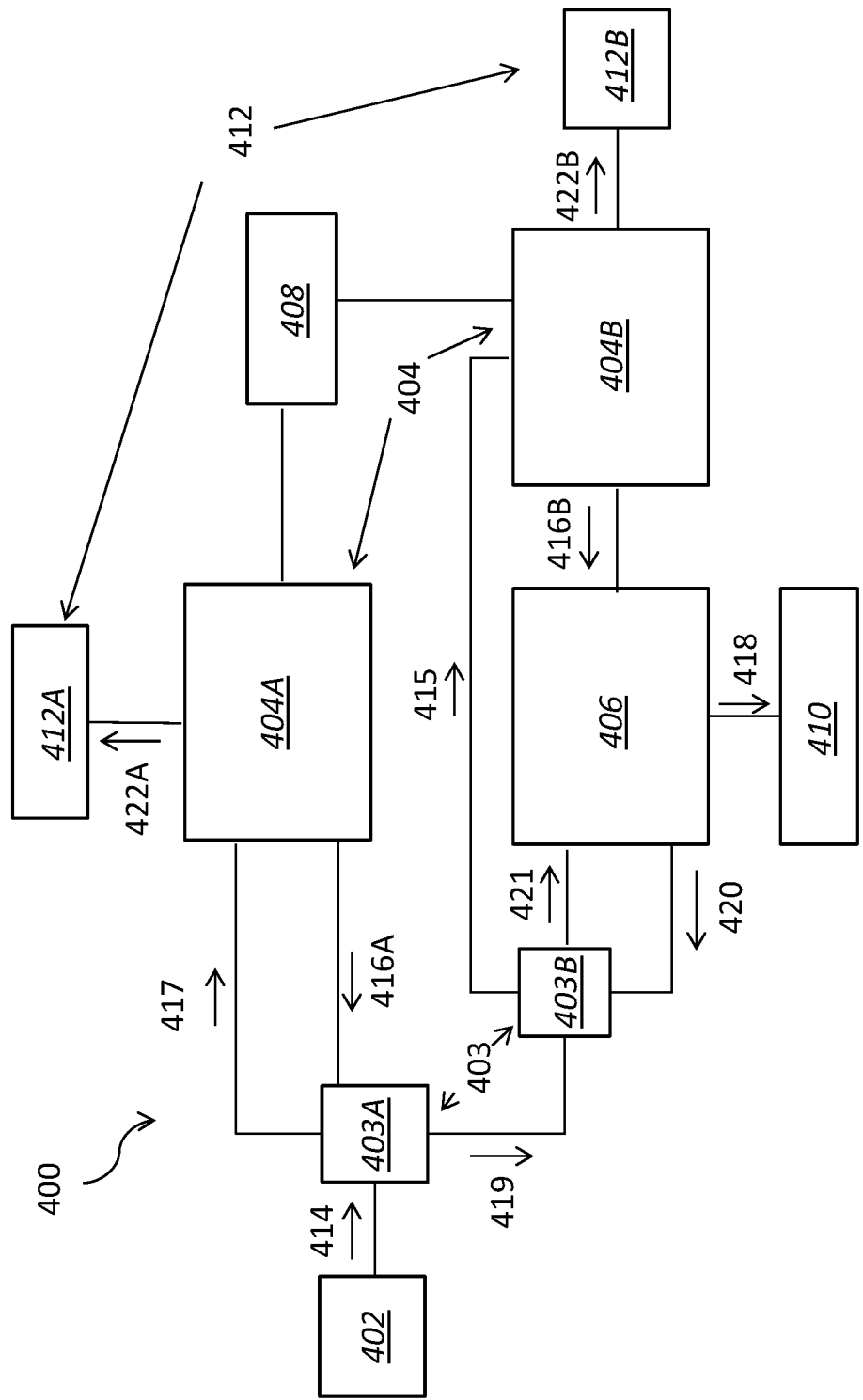
FIG. 4 is a simplified schematic view of an aqueous solution treatment system, in accordance with a yet further embodiment of the disclosure.

One of ordinary skill in the art will appreciate that, in accordance with additional embodiments of the disclosure, the components and component configurations of the aqueous solution treatment system 100 described above in relation to FIG. 1 may be readily adapted to the different aqueous solution treatment needs. By way of non-limiting example, FIGS. 2 through 4 illustrate simplified schematic views of additional aqueous solution treatment systems, in accordance with additional embodiments of the disclosure. The aqueous solution treatment systems shown in FIGS. 2 through 4 may have some similar components and functionalities to the aqueous solution treatment system 100 previously described. However, as described in further detail below, the aqueous solution treatment systems described with reference to FIGS. 2 through 4 may include additional components (e.g., additional apparatuses) and/or different component configurations (e.g., different sizes, different shapes, different materials, different features, different arrangements) to facilitate desired aqueous solution treatment operations. To avoid repetition, not all features shown in FIGS. 2 through 4 are described in detail herein. Rather, unless described otherwise below, a feature designated by a reference numeral that is a 100 increment of the reference numeral of a previously described feature (whether the previously described feature is first described before the present paragraph, or is first described after the present paragraph) will be understood to be substantially similar to the previously described feature.

FIG. 2 illustrates an aqueous solution treatment system 200, in accordance with an embodiment of the disclosure. Components of the aqueous solution treatment system 200 may be employed to separate water from solute(s) of an aqueous solution stream 214 using water extraction and fractional precipitation, as described in further detail below. The aqueous solution treatment system 200 may include at least one aqueous solution source 202, at least one condensable material separation apparatus 204 (e.g., degasser), at least one contactor apparatus 206 (e.g., gas-liquid contactor, liquid-liquid contactor) in fluid communication with the aqueous solution source 202 and the condensable material separation apparatus 204, and at least one fluid interaction apparatus 203 in fluid communication with each of the aqueous solution source 202, the contactor apparatus 206, and the condensable material separation apparatus 204. The fluid interaction apparatus 203 may be downstream of the aqueous solution source 202. The condensable material separation apparatus 204 may be downstream of the fluid interaction apparatus 203. The contactor apparatus 206 may be downstream of the condensable material separation apparatus 204 and in fluid communication with (e.g., to effectuate a circulation loop) the fluid interaction apparatus 203. The aqueous solution treatment system 200 may also include one or more of at least one energy source 208 operatively associated with the condensable material separation apparatus 204, at least one solids containment vessel 210 downstream of the contactor apparatus 206, and at least one liquid containment vessel 212 downstream of the condensable material separation apparatus 204.

The fluid interaction apparatus 203 may be configured and operated to receive the aqueous solution stream 214 from the aqueous solution source 202 and a liquid effluent stream 220 from the contactor apparatus 206, and to interact (e.g., mix) the aqueous solution stream 214 and the liquid effluent stream 220 therein to form a water-enriched stream 215 and a water-depleted stream 221. By way of non-limiting example, the fluid interaction apparatus 203 may comprise one or more of a four-way valve, four-way pipe fitting, and a mixer (e.g., a liquid-liquid mixer). The aqueous solution stream 214 and the liquid effluent stream 220 may be substantially similar to the aqueous solution stream 114 and the liquid effluent stream 120 previously described with reference to FIG. 1, respectively. For example, the aqueous solution stream 214 may comprise water and at least one solute (e.g., dissolved solid), and the liquid effluent stream 220 may comprise water and at least one condensable material (e.g., a hydrophilic condensable material, such as DME). Within the fluid interaction apparatus 203, the condensable material(s) of the liquid effluent stream 220 may separate (e.g., extract, pull, move) water of the aqueous solution stream 214 from solute(s) of the aqueous solution stream 214 to form the water-enriched stream 215 and the water-depleted stream 221. The water-enriched stream 215 includes water from the aqueous solution stream 214, water from the liquid effluent stream 220, and the condensable material(s) from the liquid effluent stream 220. The water-depleted stream 221 includes water from the aqueous solution stream 214, water from the liquid effluent stream 220, and the solute(s) from the aqueous solution stream 214. The water-enriched stream 215 is rich in water and condensable material(s) and depleted in solute(s) from the aqueous solution stream 214 as compared to water-depleted stream 221. Conversely, the water-depleted stream 221 is rich in solute(s) from the aqueous solution stream 214 and depleted in water and condensable material(s) as compared to water-enriched stream 215.

The contactor apparatus 206 may receive the water-depleted stream 221 (or, during a startup run, the aqueous solution stream 214) from the fluid interaction apparatus 203 and a treatment stream 216 from the condensable material separation apparatus 204. A material composition of the treatment stream 216 may be substantially similar to that of the treatment stream 116 previously described with reference to FIG. 1. For example, the treatment stream 216 may be formed of and include at least one condensable material (e.g., at least one hydrophilic condensable material). In some embodiments, the condensable material of the treatment stream 216 comprises DME. The treatment stream 216 may comprise a liquid phase of the condensable material(s). The liquid phase of the condensable material(s) may, for example, be facilitated (e.g., effectuated, obtained) through compression (e.g., by way of one or more compressors) of a gaseous phase of the condensable material(s) ahead (e.g., upstream) of the contactor apparatus 206 (e.g., within the condensable material separation apparatus 204, outside of the condensable material separation apparatus 204 but upstream of the contactor apparatus 206). In some embodiments, the treatment stream 216 is substantially free of materials other than the condensable material(s) (e.g., the treatment stream 216 only includes the condensable material(s)).

Within the contactor apparatus 206 the condensable material of the treatment stream 216 interacts with the water-depleted stream 221 to fractionally precipitate at least a portion (e.g., at least a majority, substantially all) of the solute(s) of the water-depleted stream 221 (or, during a startup run, the aqueous solution stream 214) out of solution and form a solids effluent stream 218 and the liquid effluent stream 220. The solids effluent stream 218 is rich in solute(s) from the water-depleted stream 221 and depleted in water from the water-depleted stream 221 as compared to the liquid effluent stream 220. The solids effluent stream 218 may exit the contactor apparatus 206, and may be utilized or disposed of as desired. In some embodiments, the solids effluent stream 218 is directed into the solids containment vessel 210 for storage and/or further processing. The liquid effluent stream 220 is rich in condensable material(s) from the treatment stream 216 and water from the water-depleted stream 221, and is depleted in solute(s) from the water-depleted stream 221 as compared to the solids effluent stream 218. The liquid effluent stream 220 may exit the contactor apparatus 206 and may be directed to the fluid interaction apparatus 203 for interaction with the aqueous solution stream 214, as previously described.

With continued reference to FIG. 2, at least a portion (e.g., substantially all) of the water-enriched stream 215 exiting the fluid interaction apparatus 203 may be directed to the condensable material separation apparatus 204. The water-enriched stream 215 may comprise a single (e.g., only one) stream including a single liquid phase (e.g., a single liquid phase including condensable material(s) and water), may comprise a single stream including multiple (e.g., more than one) liquid phases (e.g., an aqueous liquid phase rich in water, and a polar organic liquid phase rich in the condensable material), or may comprise multiple streams each individually including a single liquid phase (e.g., a single liquid phase including the condensable material and water) or multiple liquid phases (e.g., an aqueous liquid phase rich in water, and a polar organic liquid phase rich in the condensable material). In some embodiments, the water-enriched stream 215 comprises a liquid phase of at least one condensable material (e.g., DME) substantially saturated with water.

The condensable material separation apparatus 204 may receive at least a portion (e.g., substantially all) of the water-enriched stream 215, and may subject the water-enriched stream 215 to change of environmental conditions (e.g., one or more of a change in temperature, pressure, and material exposure(s)) to separate the condensable material(s) of the water-enriched stream 215 from the water of the water-enriched stream 215. Subjecting the received portion(s) of water-enriched stream 215 to a change of environmental conditions may, for example, be effectuated by exposing the received portion(s) of the water-enriched stream 215 to one or more of elevated temperature (e.g., by heating the water-enriched stream 215 using energy supplied from an energy source 208) and reduced pressure (e.g., by expanding the water-enriched stream 215 using at least one expansion device, such as one or more of an expansion turbine and an expansion valve). The separated condensable material(s) may be used to reform the treatment stream 216, and the separated water may be used to form at least one liquid product stream 222. The liquid product stream 222 may be rich in water and depleted in the condensable material(s) relative to the treatment stream 216. As shown in FIG. 2, the liquid product stream 222 may be directed into the liquid containment vessel 212, and may be utilized or disposed of as desired.

FIG. 3 illustrates an aqueous solution treatment system 300, in accordance with additional embodiments of the disclosure. The aqueous solution treatment system 300 may have some similar components and functionalities to the aqueous solution treatment system 100 previously described with reference to FIG. 1. However, the aqueous solution treatment system 300 may, for example, include a relatively greater quantity of components (e.g., condensable material separation apparatuses, contactor apparatuses, containment vessels) and/or different component configurations (e.g., different sizes, different shapes, different materials, different features, different arrangements) to facilitate desired aqueous solution treatment operations. In some embodiments, the aqueous solution treatment system 300 is employed to isolate one or more organic liquids (e.g., hydrocarbon liquids) present within an aqueous solution stream from one or more other materials (e.g., water, dissolved solids) of the aqueous solution stream.

Referring to FIG. 3, the aqueous solution treatment system 300 may include multiple (e.g., more than one) condensable material separation apparatuses 304, multiple contactor apparatuses 306, and multiple liquid containment vessels 312. For example, as shown in FIG. 3, the aqueous solution treatment system 300 may include a first condensable material separation apparatus 304A, a second condensable material separation apparatus 304B, a first contactor apparatus 306A, a second contactor apparatus 306B, a first liquid containment vessel 312A, and a second liquid containment vessel 312B. The first contactor apparatus 306A may be downstream of the aqueous solution source 302, the first condensable material separation apparatus 304A may be in fluid communication with (e.g., to effectuate a recycle loop) the first contactor apparatus 306A, the first liquid containment vessel 312A may be downstream of the first condensable material separation apparatus 304A, the second contactor apparatus 306B may be downstream of the first contactor apparatus 306A, and the second condensable material separation apparatus 304B may be in fluid communication with (e.g., to effectuate another recycle loop) the second contactor apparatus 306B, and the second liquid containment vessel 312B may be downstream of the second condensable material separation apparatus 304B.

During use and operation, the first contactor apparatus 306A may receive an aqueous solution stream 314 from the aqueous solution source 302 and a first treatment stream 316A from the first condensable material separation apparatus 304A. The aqueous solution stream 314 includes water, at least one organic liquid (e.g., a hydrocarbon liquid), and at least one dissolved solid. The first treatment stream 316A includes at least one condensable material. In some embodiments, the condensable material of the first treatment stream 316A comprises a hydrophilic condensable gas (e.g., DME). In the first contactor apparatus 306A, the first treatment stream 316A interacts with the aqueous solution stream 314 to separate the organic liquid of the aqueous solution stream 314 from the water and the dissolved solid of the aqueous solution stream 314 and form at least one first liquid effluent stream 320A and at least one second liquid effluent stream 320B. The first liquid effluent stream 320A is rich in the organic liquid of the aqueous solution stream 314 and the condensable material of the first treatment stream 316A. The second liquid effluent stream 320B is rich in the water and the dissolved solid of the aqueous solution stream 314.

Each of the first liquid effluent stream 320A and the second liquid effluent stream 320B may individually comprise a single (e.g., only one) stream including a single phase (e.g., a single liquid phase), may comprise a single stream including multiple phases (e.g., two different liquid phases), or may comprise multiple streams each individually including a single phase or multiple phases. As a non-limiting example, the first liquid effluent stream 320A may comprise a single stream including a single liquid phase including the organic liquid, the condensable material, and water; may comprise a single stream including multiple phases (e.g., first liquid phase rich in the condensable material, and a second liquid phase rich in the organic liquid), or may comprise multiple streams each individually including a single phase (e.g., a single liquid phase including organic liquid, the condensable material, and water; a single liquid phase rich in the organic liquid; a single liquid phase rich in the condensable material) or multiple phases (e.g., multiple liquid phases). As another non-limiting example, the second liquid effluent stream 320B may comprise a single stream including a single liquid phase including water and dissolved solids; may comprise a single stream including multiple phases (e.g., multiple liquid phases), or may comprise multiple streams each individually including a single phase or multiple phases.

At least a portion of the first liquid effluent stream(s) 320A (e.g., an entirety of the first liquid effluent stream(s) 320A; one or more portions of the first liquid effluent stream(s) 320A rich in the condensable material) may be directed into the first condensable material separation apparatus 304A, wherein a change of environmental conditions (e.g., one or more of a change in temperature, pressure, and material exposure(s)) may be effectuated to separate the condensable material from the organic liquid and water. The first condensable material separation apparatus 304A may facilitate the at least partial reformation of the first treatment stream 316A, and may also from form at least one first liquid product stream 322A rich in the organic liquid and depleted in the condensable material. The first liquid product stream 322A may be directed into the first liquid containment vessel 312A, and may be utilized or disposed of as desired.

At least a portion of the second liquid effluent stream(s) 320B (e.g., an entirety of the second liquid effluent stream(s) 320B; one or more portions of the second liquid effluent stream(s) 320B rich in water and dissolved solids) is directed into the second contactor apparatus 306B, which also receives a second treatment stream 316B including at least one additional condensable material from the second condensable material separation apparatus 304B. The additional condensable material of the second treatment stream 316B may be the same as the condensable material of the first treatment stream 316A, or the additional condensable material of the second treatment stream 316B may be different than the condensable material of the first treatment stream 316A. In some embodiments, the additional condensable material comprises a hydrophilic condensable gas (e.g., DME). In the second contactor apparatus 306B, the second treatment stream 316B interacts with the received portion(s) of the second liquid effluent stream(s) 320B to fractionally precipitate the dissolved solid out of solution and form at least one solids effluent stream 318 and at least one third liquid effluent stream 320C. The solids effluent stream 318 is rich in the solute of the aqueous solution stream 314. The third liquid effluent stream 320C is depleted in the solute of the aqueous solution stream 314 and is rich in the water of the aqueous solution stream 314 and the additional condensable material of the second treatment stream 316B. The solids effluent stream(s) 318 may be directed into the solids containment vessel 310, and may be utilized or disposed of as desired.

The third liquid effluent stream 320C may comprise a single (e.g., only one) stream including a single phase (e.g., a single liquid phase including water and the additional condensable material), may comprise a single stream including multiple (e.g., more than one) phases (e.g., an aqueous liquid phase rich in water, and a polar organic liquid phase rich in the additional condensable material; a liquid phase including one or more of water and the condensable material, and a gaseous phase including one or more of water and the additional condensable material; etc.), or may comprise multiple streams each individually including a single phase (e.g., a single liquid phase including water and the additional condensable material; a single aqueous liquid phase rich in water; a single polar organic liquid phase rich in the additional condensable material) or multiple phases (e.g., an aqueous liquid phase rich in water, and a polar organic liquid phase rich in the additional condensable material; a liquid phase including one or more of water and the additional condensable material, and a gaseous phase including one or more of water and the additional condensable material).

At least a portion of the third liquid effluent stream(s) 320C (e.g., an entirety of the third liquid effluent stream(s) 320C; one or more portions of the third liquid effluent stream(s) 320C rich the additional condensable material) may be directed into the second condensable material separation apparatus 304B, wherein a change of environmental conditions (e.g., one or more of a change in temperature, pressure, and material exposure(s)) may be effectuated to separate the additional condensable material from the water. The second condensable material separation apparatus 304B may facilitate the at least partially reformation of the second treatment stream 316B, and may also form at least one second liquid product stream 322B rich in water and depleted in the additional condensable material. The second liquid product stream(s) 322B may be directed into the second liquid containment vessel 312B, and may be utilized or disposed of as desired.

The first contactor apparatus 306A and the second contactor apparatus 306B may each individually be substantially similar to the contactor apparatus 106 previously described with reference to FIG. 1. However, the first contactor apparatus 306A and the second contactor apparatus 306B may exhibit different configurations (e.g., one of more of different sizes, different shapes, different materials, different features, and different feature arrangements) and/or may be operated in different manners (e.g., one or more of different input stream material compositions, different stream flow rates, different operating pressures, and different operating temperatures) than one another to effectuate the formation of different effluent streams (e.g., the first liquid effluent stream(s) 320A and the second liquid effluent stream(s) 320B for the first contactor apparatus 306A; the third liquid effluent stream(s) 320C and the solids effluent stream(s) 318 for the second contactor apparatus 306B) from the different input streams (e.g., the aqueous solution stream 314 and the first treatment stream 316A for the first contactor apparatus 306A; the second liquid effluent stream(s) 320B and the second treatment stream 316B for the second contactor apparatus 306B) respectively received thereby.

The first condensable material separation apparatus 304A and the second condensable material separation apparatus 304B may each individually be substantially similar to the condensable material separation apparatus 104 previously described with reference to FIG. 1. In some embodiments, each of the first condensable material separation apparatus 304A and the second condensable material separation apparatus 304B individually comprises a degassing apparatus. However, the first condensable material separation apparatus 304A and the second condensable material separation apparatus 304B may exhibit different configurations (e.g., one of more of different sizes, different shapes, different materials, different features, and different feature arrangements) and/or may be operated in different manners (e.g., one or more of different condensable gas(es), different flow rates, different operating pressures, and different operating temperatures) than one another to effectuate the formation of different treatment streams (e.g., the first treatment stream 316A for the first condensable material separation apparatus 304A; the second treatment stream 316B for the second condensable material separation apparatus 304B) and different liquid product streams (e.g., the first liquid product stream(s) 322A for the first condensable material separation apparatus 304A; the second liquid product stream(s) 322B for the second condensable material separation apparatus 304B) from the different input streams (e.g., the first liquid effluent stream(s) 320A for the first condensable material separation apparatus 304A; the third liquid effluent stream(s) 320C for the second condensable material separation apparatus 304B) respectively received thereby.

The first liquid containment vessel 312A and the second liquid containment vessel 312B may each individually be substantially similar to the liquid containment vessel 112 previously described with reference to FIG. 1. However, the first liquid containment vessel 312A and the second liquid containment vessel 312B may exhibit different configurations (e.g., one of more of different sizes, different shapes, different materials, different features, and different feature arrangements) to receive and at least temporarily contain the different liquid product streams (e.g., the first liquid product stream(s) 322A for the first liquid containment vessel 312A; the second liquid product stream(s) 322B for the second liquid containment vessel 312B) respectively received thereby.

FIG. 4 illustrates an aqueous solution treatment system 400, in accordance with additional embodiments of the disclosure. The aqueous solution treatment system 400 may have some similar components and functionalities to the aqueous solution treatment system 200 previously described with reference to FIG. 2 and the aqueous solution treatment system 300 previously described with reference to FIG. 3. However, the aqueous solution treatment system 400 may, for example, include additional components (e.g., additional apparatuses) and/or different component configurations (e.g., different sizes, different shapes, different materials, different features, different arrangements) to facilitate desired aqueous solution treatment operations. Components of the aqueous solution treatment system 400 may, for example, be employed to isolate one or more organic liquid(s) (e.g., hydrocarbon liquids) present within an aqueous solution stream 414 from water and additional solute(s) (e.g., dissolved solids, such as salts and/or scalants) of the aqueous solution stream 414, and may also be employed to separate the additional solute(s) of the aqueous solution stream 414 from water (e.g., through water extraction and fractional precipitation), as described in further detail below.

The aqueous solution treatment system 400 may include multiple (e.g., more than one) fluid interaction apparatuses 403, multiple condensable material separation apparatuses 404, at least one contactor apparatus 406, and multiple liquid containment vessels 412. For example, as shown in FIG. 4, the aqueous solution treatment system 400 may include a first fluid interaction apparatus 403A, a second fluid interaction apparatus 403B, a first condensable material separation apparatus 404A, a second condensable material separation apparatus 404B, the contactor apparatus 406, a first liquid containment vessel 412A, and a second liquid containment vessel 412B. The first fluid interaction apparatus 403A may be downstream of the aqueous solution source 402, and the second fluid interaction apparatus 403B may be downstream of the first fluid interaction apparatus 403A. The first condensable material separation apparatus 404A may be in fluid communication with (e.g., to effectuate a first circulation loop) the first fluid interaction apparatus 403A, and the first liquid containment vessel 412A may be downstream of the first condensable material separation apparatus 404A. The contactor apparatus 406 may be downstream of the second condensable material separation apparatus 404B and in fluid communication with (e.g., to effectuate a second circulation loop) the second fluid interaction apparatus 403B. The second liquid containment vessel 412B may be downstream of the second condensable material separation apparatus 404B. The aqueous solution treatment system 400 may also include one or more of at least one energy source 408 operatively associated with one or more of the first condensable material separation apparatus 404A and the second condensable material separation apparatus 404B, and at least one solids containment vessel 410 downstream of the contactor apparatus 406.

The first fluid interaction apparatus 403A may be configured and operated to receive the aqueous solution stream 414 from the aqueous solution source 402 and a first treatment stream 416A from the first condensable material separation apparatus 404A, and to interact (e.g., mix) the aqueous solution stream 414 and the first treatment stream 416A therein to form an organic-liquid-enriched stream 417 and an organic-liquid-depleted stream 419. By way of non-limiting example, the first fluid interaction apparatus 403A may comprise one or more of a four-way valve, four-way pipe fitting, and a mixer (e.g., a liquid-liquid mixer). The aqueous solution stream 414 and the first treatment stream 416A may be substantially similar to the aqueous solution stream 314 previously described with reference to FIG. 3, and the first treatment stream 416A may be substantially similar to the treatment stream 216 previously described with reference to FIG. 2. For example, the aqueous solution stream 414 may comprise water, at least one organic liquid (e.g., a hydrocarbon liquid), and at least one dissolved solid; and the first treatment stream 416A may comprise a liquid phase of at least one condensable material (e.g., a liquid phase of a hydrophilic condensable material, such as liquid DME). Within the first fluid interaction apparatus 403A, the condensable material(s) of the first treatment stream 416A may separate (e.g., extract, pull, move) organic liquid(s) of the aqueous solution stream 414 from water and dissolved solid(s) of the aqueous solution stream 414 to form the organic-liquid-enriched stream 417 and the organic-liquid-depleted stream 419. The organic-liquid-enriched stream 417 includes organic liquid(s) from the aqueous solution stream 414 and the condensable material(s) from the first treatment stream 416A. The organic-liquid-depleted stream 419 includes water and the dissolved solid(s) from the aqueous solution stream 414. The organic-liquid-enriched stream 417 is rich in organic liquid and condensable material(s) and depleted in water and dissolved solid(s) from the aqueous solution stream 414 as compared to the organic-liquid-depleted stream 419. Conversely, the organic-liquid-depleted stream 419 is rich in water and dissolved solid(s) from the aqueous solution stream 414 and depleted in organic liquid and condensable material(s) as compared to the organic-liquid-enriched stream 417.

With continued reference to FIG. 4, at least a portion (e.g., substantially all) of the organic-liquid-enriched stream 417 exiting the first fluid interaction apparatus 403A may be directed to the first condensable material separation apparatus 404A. The organic-liquid-enriched stream 417 may comprise a single (e.g., only one) stream including a single liquid phase (e.g., a single liquid phase including condensable material(s) and organic liquid(s)), may comprise a single stream including multiple (e.g., more than one) liquid phases, or may comprise multiple streams each individually including a single liquid phase (e.g., a single liquid phase including the condensable material(s) and the organic liquid(s)) or multiple liquid phases. In some embodiments, the organic-liquid-enriched stream 417 comprises a liquid phase of at least one condensable material (e.g., DME) substantially saturated with at least one organic liquid.

The first condensable material separation apparatus 404A may receive at least a portion (e.g., substantially all) of the organic-liquid-enriched stream 417, and may subject the organic-liquid-enriched stream 417 to change of environmental conditions (e.g., one or more of a change in temperature, pressure, and material exposure(s)) to separate the condensable material(s) of the organic-liquid-enriched stream 417 from the organic liquid(s) of the organic-liquid-enriched stream 417. Subjecting the received portion(s) of organic-liquid-enriched stream 417 to a change of environmental conditions may, for example, be effectuated by exposing the received portion(s) of the organic-liquid-enriched stream 417 to one or more of elevated temperature (e.g., by heating the organic-liquid-enriched stream 417 using energy supplied from the energy source 408) and reduced pressure (e.g., by expanding the organic-liquid-enriched stream 417 using at least one expansion device, such as one or more of an expansion turbine and an expansion valve). The separated condensable material(s) may be used to reform the first treatment stream 416A, and the separated organic liquid may be used to form at least one first liquid product stream 422A. The first liquid product stream 422A may be rich in organic liquid(s) and depleted in the condensable material(s) relative to the first treatment stream 416A. As shown in FIG. 4, the first liquid product stream 422A may be directed into the first liquid containment vessel 412A, and may be utilized or disposed of as desired.

Still referring to FIG. 4, at least a portion (e.g., substantially all) of the organic-liquid-depleted stream 419 exiting the first fluid interaction apparatus 403A may be directed to the second fluid interaction apparatus 403B. The second fluid interaction apparatus 403B may be configured and operated to receive the organic-liquid-depleted stream 419 from the first fluid interaction apparatus 403A and a liquid effluent stream 420 from the contactor apparatus 406, and to interact (e.g., mix) the organic-liquid-depleted stream 419 and the liquid effluent stream 420 therein to form a water-enriched stream 415 and a water-depleted stream 421. By way of non-limiting example, the second fluid interaction apparatus 403B may comprise one or more of a four-way valve, four-way pipe fitting, and a mixer (e.g., a liquid-liquid mixer). The liquid effluent stream 420 may comprise water and at least one condensable material (e.g., a hydrophilic condensable material, such as DME). Within the second fluid interaction apparatus 403B, the condensable material(s) of the liquid effluent stream 420 may separate (e.g., extract, pull, move) water of the organic-liquid-depleted stream 419 from dissolved solid(s) of the organic-liquid-depleted stream 419 to form the water-enriched stream 415 and the water-depleted stream 421. The water-enriched stream 415 includes water from the organic-liquid-depleted stream 419, water from the liquid effluent stream 420, and the condensable material(s) from the liquid effluent stream 420. The water-depleted stream 421 includes water from the organic-liquid-depleted stream 419, water from the liquid effluent stream 420, and the dissolved solid(s) from the organic-liquid-depleted stream 419. The water-enriched stream 415 is rich in water and condensable material(s) and depleted in dissolved solid(s) from the aqueous solution stream 414 as compared to water-depleted stream 421. Conversely, the water-depleted stream 421 is rich in dissolved solid(s) from the organic-liquid-depleted stream 419 and depleted in water and condensable material(s) as compared to water-enriched stream 415.

The contactor apparatus 406 may be configured and operated to receive the water-depleted stream 421 from the second fluid interaction apparatus 403B and a second treatment stream 416B from the second condensable material separation apparatus 404B. A material composition of the second treatment stream 416B may be substantially the same as or may be different than a material composition of the first treatment stream 416A. The second treatment stream 416B may, for example, be formed of and include at least one condensable material (e.g., at least one hydrophilic condensable material). In some embodiments, the condensable material of the second treatment stream 416B comprises DME. The second treatment stream 416B may comprise a liquid phase of the condensable material(s). The liquid phase of the condensable material(s) may, for example, be facilitated (e.g., effectuated, obtained) through compression (e.g., by way of one or more compressors) of a gaseous phase of the condensable material(s) ahead (e.g., upstream) of the contactor apparatus 406 (e.g., within the second condensable material separation apparatus 404B, outside of the second condensable material separation apparatus 404B but upstream of the contactor apparatus 406). In some embodiments, the second treatment stream 416B is substantially free of materials other than the condensable material(s) (e.g., the second treatment stream 416B only includes the condensable material(s)).

Within the contactor apparatus 406 the condensable material of the second treatment stream 416B interacts with the water-depleted stream 421 to fractionally precipitate at least a portion (e.g., at least a majority, substantially all) of the dissolved solid(s) of the water-depleted stream 421 out of solution and form a solids effluent stream 418 and the liquid effluent stream 420. The solids effluent stream 418 is rich in solute(s) from the water-depleted stream 421 and depleted in water from the water-depleted stream 421 as compared to the liquid effluent stream 420. The solids effluent stream 418 may exit the contactor apparatus 406, and may be utilized or disposed of as desired. In some embodiments, the solids effluent stream 418 is directed into the solids containment vessel 410 for storage and/or further processing. The liquid effluent stream 420 is rich in condensable material(s) from the second treatment stream 416B and water from the water-depleted stream 421, and is depleted in solute(s) from the water-depleted stream 421 as compared to the solids effluent stream 418. The liquid effluent stream 420 may exit the contactor apparatus 406 and may be directed to the second fluid interaction apparatus 403B for interaction with the organic-liquid-depleted stream 419, as previously described.

With continued reference to FIG. 4, at least a portion (e.g., substantially all) of the water-enriched stream 415 exiting the second fluid interaction apparatus 403B may be directed to the second condensable material separation apparatus 404B. The water-enriched stream 415 may comprise a single (e.g., only one) stream including a single liquid phase (e.g., a single liquid phase including condensable material(s) and water), may comprise a single stream including multiple (e.g., more than one) liquid phases, or may comprise multiple streams each individually including a single liquid phase (e.g., a single liquid phase including the condensable material and water) or multiple liquid phases. In some embodiments, the water-enriched stream 415 comprises a liquid phase of at least one condensable material (e.g., DME) substantially saturated with water.

The second condensable material separation apparatus 404B may receive at least a portion (e.g., substantially all) of the water-enriched stream 415, and may subject the water-enriched stream 415 to change of environmental conditions (e.g., one or more of a change in temperature, pressure, and material exposure(s)) to separate the condensable material(s) of the water-enriched stream 415 from the water of the water-enriched stream 415. Subjecting the received portion(s) of water-enriched stream 415 to a change of environmental conditions may, for example, be effectuated by exposing the received portion(s) of the water-enriched stream 415 to one or more of elevated temperature (e.g., by heating the water-enriched stream 415 using energy supplied from the energy source 408) and reduced pressure (e.g., by expanding the water-enriched stream 415 using at least one expansion device, such as one or more of an expansion turbine and an expansion valve). The separated condensable material(s) may be used to reform the second treatment stream 416B, and the separated water may be used to form at least one second liquid product stream 422B. The second liquid product stream 422B may be rich in water and depleted in the condensable material(s) relative to the second treatment stream 416B. As shown in FIG. 4, the second liquid product stream 422B may be directed into the second liquid containment vessel 412B, and may be utilized or disposed of as desired.

Additional non-limiting example embodiments of the disclosure are described below.

Embodiment 1: A method of treating an aqueous solution comprises forming a treatment stream comprising a condensable material. The treatment stream is introduced to an aqueous solution comprising water and a solute to fractionally precipitate the solute out of the aqueous solution and form a solids stream comprising the solute and an aqueous liquid stream comprising at least one solute-depleted solution of the water and the condensable material. The condensable material of at least a portion of the aqueous liquid stream is separated from the water of the at least a portion of the aqueous liquid stream to at least partially reform the treatment stream and form an aqueous liquid product stream depleted in the solute.

Embodiment 2: The method of Embodiment 1, wherein the aqueous liquid stream comprises an aqueous liquid phase comprising a solute-depleted solution rich in the water and an organic-dominant liquid phase comprising another solute-depleted solution rich in the condensable material, and wherein separating the condensable material of the at least one aqueous liquid stream from the water of the aqueous liquid stream comprises one or more of: separating the water of the solute-depleted solution of the aqueous liquid phase from the condensable material of the solute-depleted solution of the aqueous liquid phase; and separating the water of the another solute-depleted solution of the organic-dominant liquid phase from the condensable material of the another solute-depleted solution of the organic-dominant liquid phase.

Embodiment 3: The method of one of Embodiments 1 and 2, wherein forming a treatment stream comprising a condensable material comprises forming the treatment stream to comprise one or more of a gas phase and a liquid phase of a hydrophilic condensable material.

Embodiment 4: The method of Embodiment 3, wherein forming the treatment stream to comprise one or more of a gas phase and a liquid phase of a hydrophilic condensable material comprises forming the treatment stream to comprise one or more of gaseous dimethyl ether and liquid dimethyl ether.

Embodiment 5: The method of one of Embodiments 3 and 4, wherein separating the condensable material of at least a portion of the aqueous liquid stream from the water of the at least a portion of the aqueous liquid stream comprises heating the at least a portion of the aqueous liquid stream to remove the hydrophilic condensable material as a gas from the water.

Embodiment 6: The method of any one of Embodiments 1 through 5, further comprising introducing the aqueous liquid stream to an additional amount of the solution to extract water from the additional amount of the solution and form a water-enriched stream comprising the condensable material from the aqueous liquid stream and water from the aqueous liquid stream and the additional amount of the solution, the aqueous liquid stream introduced to the additional amount of the solution prior to introducing the additional amount of the solution to an additional amount of the treatment stream.

Embodiment 7: The method of Embodiment 6, further comprising separating the condensable material of at least a portion of the water-enriched stream from the water of the at least one portion of the aqueous liquid stream.

Embodiment 8: The method of any one of Embodiments 1 through 7, further comprising: forming an additional treatment stream comprising additional condensable material; introducing the additional treatment stream to another solution comprising the water of the solution, the solute of the solution, and at least one organic liquid to extract the organic liquid and form the another solution and form an organic-liquid-enriched stream comprising the additional condensable material and the organic liquid; and separating the additional condensable material of at least a portion of the organic-liquid-enriched stream from the organic liquid of the at least one portion of the organic-liquid-enriched stream to at least partially reform the additional treatment stream and form an organic liquid product stream comprising the organic liquid.

Embodiment 9: The method of Embodiment 8, wherein forming an additional treatment stream comprising additional condensable material comprises forming the additional treatment stream to consist essentially of a liquid phase of the additional condensable material.

Embodiment 10: An aqueous solution treatment system comprises a source of an aqueous solution comprising water and a solute, a condensable material separation apparatus, and a contactor apparatus. The condensable material separation apparatus is configured to produce a treatment stream comprising a condensable material. The contactor apparatus is in fluid communication with the source of the aqueous solution and the condensable material separation apparatus, and is configured to interact the aqueous solution and the treatment stream with one another to fractionally precipitate the solute out of the aqueous solution and form a solids stream and one or more solute-depleted, aqueous liquid streams. The solids stream comprises the solute. The one or more solute-depleted, aqueous liquid streams comprise at least one solution of the water and the condensable material.

Embodiment 11: The aqueous solution treatment system of Embodiment 10, wherein the condensable material separation apparatus is configured and positioned to receive the aqueous liquid stream from the contactor apparatus and modify one or more of a temperature, pressure, and material exposure of the aqueous liquid stream to at least partially reform the treatment stream.

Embodiment 12: The aqueous solution treatment system of one of Embodiments 10 and 11, wherein the condensable material separation apparatus comprises one or more of at least one heat energy recovery device and at least one pressure energy recovery device.

Embodiment 13: The aqueous solution treatment system of any one of Embodiments 10 through 12, further comprising a fluid interaction apparatus configured and positioned to receive and interact one or more portions of the aqueous solution and at least one of the one or more solute-depleted, aqueous liquid streams to remove water from the one or more portions of the aqueous solution through liquid extraction driven by the condensable material.

Embodiment 14: The aqueous solution treatment system of any one of Embodiments 10 through 13, further comprising: another condensable material separation apparatus configured to produce another treatment stream comprising an additional condensable material; and an interaction apparatus configured and positioned to receive and interact the another condensable material and the aqueous solution to remove an organic liquid from the aqueous solution through liquid extraction driven by the another condensable material.

Embodiment 15: A method of treating an aqueous solution comprises forming a first treatment stream comprising condensable material. A second treatment stream comprising additional condensable material is formed. The first treatment stream is introduced to an aqueous solution comprising water, an organic liquid, and a dissolved solid to form a first liquid stream and a second liquid stream. The first liquid stream comprises the organic liquid and the first condensable material. The second liquid stream comprises the water and the dissolved solid. The first condensable material of the first liquid stream is separated from the organic liquid of the first liquid stream to at least partially reform the first treatment stream and form a first liquid product stream comprising the organic liquid. The second treatment stream is introduced to the second liquid stream to fractionally precipitate the dissolved solid out of solution and form a solids stream and a third liquid stream. The solids stream comprises the precipitated solid. The third liquid stream comprises the water and the second condensable material. The second condensable material of the third liquid stream is separated from the water of the third liquid stream to at least partially reform the second treatment stream and form a second liquid product stream comprising the water.

Embodiment 16: The method of Embodiment 15, further comprising selecting the first condensable material and the second condensable material to be the same as one another.

Embodiment 17: The method of one of Embodiments 15 and 16, further comprising selecting the first condensable material and the second condensable material to be different than the second condensable material.

Embodiment 18: The method of any one of Embodiments 15 through 17, wherein forming the first treatment stream comprises forming the first treatment stream to comprise a gaseous phase of the first condensable material; and forming the second treatment stream comprises forming the second treatment stream to comprise a gaseous phase of the first condensable material.

Embodiment 19: The method of any one of Embodiments 15 through 17, wherein forming the first treatment stream comprises forming the first treatment stream to comprise a liquid phase of the first condensable material; and forming the second treatment stream comprises forming the second treatment stream to comprise a liquid phase of the first condensable material.

Embodiment 20: An aqueous solution treatment system comprises a source of an aqueous solution comprising water, an organic liquid, and a dissolved solid; a first condensable material separation apparatus; a first contactor apparatus, a second condensable material separation apparatus; and a second contactor apparatus. The first condensable material separation apparatus is configured to produce a first treatment stream comprising condensable material. The first contactor apparatus is in fluid communication with the source of the aqueous solution and the first condensable material separation apparatus, and is configured to interact the aqueous solution and the first treatment stream with one another to form a first liquid stream and a second liquid stream. The first liquid stream comprises the organic liquid and the condensable material. The second liquid stream comprises the water and the dissolved solid. The second condensable material separation apparatus is configured to produce a second treatment stream comprising additional condensable material. The second contactor apparatus is in fluid communication with the first contactor apparatus and the second condensable material separation apparatus, and is configured to interact the second liquid stream and the second treatment stream with one another to fractionally precipitate the dissolved solid out of solution and form a solids stream and a second liquid product stream. The solids stream comprises the precipitated solid. The second liquid product stream comprises the water.

The methods and systems of the disclosure facilitate the treatment (e.g., purification) of solutions including high levels TDSs through a zero liquid discharge (ZLD) process that circumvents the distillation of solvents (e.g., liquid water, organic liquids) and difficulties associated with recycling heat of vaporization. The methods and systems of the disclosure may be more effective, more efficient, and/or less costly than conventional methods and conventional systems for separating two or more of liquid water, organic liquids, and dissolved solids from one another.

The following examples serve to explain embodiments of the disclosure in more detail. These examples are not to be construed as being exhaustive or exclusive as to the scope of the disclosure.

EXAMPLES

Example 1

An aqueous liquid solution comprising water and 1,804 ppm calcium sulfate ($CaSO_4$) was subjected to solvent (e.g., water) softening using DME-driven fractional precipitation. Liquid DME (25° C., 0.5 Megapascals (MPa)) was added to the aqueous liquid solution. The addition of the liquid DME forced a portion of the $CaSO_4$ to precipitate out of solution. The amount of $CaSO_4$ in solution was reduced from 1,804 ppm to 132 ppm, corresponding to greater than 92 percent $CaSO_4$ removal using DME-driven fractional precipitation. Increased $CaSO_4$ removal efficiency is expected through optimization of process parameters. The relatively high $CaSO_4$ removal efficiency facilitated through condensable gas (e.g., DME) driven fractional precipitation offers advantages to may water treatment operations, such as the treatment of flue-gas desulfurization (FGD) wastewater.

Example 2

An aqueous liquid solution comprising water and 15,400 ppm sodium metasilicate ($Na_2SiO_3$) was subjected to solvent (e.g., water) softening using DME-driven fractional precipitation. Liquid DME (25° C., 0.5 MPa) was added to the aqueous liquid solution. The addition of the liquid DME forced a portion of the $Na_2SiO_3$ to precipitate out of solution. The amount of $Na_2SiO_3$ in solution was reduced from 15,400 ppm to 680 ppm, corresponding to greater than 95 percent $Na_2SiO_3$ removal using DME-driven fractional precipitation. Increased $Na_2SiO_3$ removal efficiency is expected through optimization of process parameters. The relatively high $Na_2SiO_3$ removal efficiency facilitated through condensable gas (e.g., DME) driven fractional precipitation offers advantages to may water treatment operations, such as the treatment of reverse osmosis (RO) concentrates.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of treating an aqueous solution, comprising:
   forming a treatment stream comprising a condensable material;
   introducing the treatment stream to a solution of water and a solute to fractionally precipitate the solute out of the solution and form a solids stream comprising the solute and an aqueous liquid stream comprising at least one solute-depleted solution of the water and the condensable material; and
   separating the condensable material of at least one portion of the aqueous liquid stream from the water of the at least one portion of the aqueous liquid stream to at least partially reform the treatment stream and form an aqueous liquid product stream depleted in the solute.

2. The method of claim 1, wherein the aqueous liquid stream comprises an aqueous liquid phase comprising a solute-depleted solution rich in the water and an organic-dominant liquid phase comprising another solute-depleted solution rich in the condensable material, and wherein separating the condensable material of the at least one aqueous liquid stream from the water of the aqueous liquid stream comprises one or more of:

separating the water of the solute-depleted solution of the aqueous liquid phase from the condensable material of the solute-depleted solution of the aqueous liquid phase; and separating the water of the another solute-depleted solution of the organic-dominant liquid phase from the condensable material of the another solute-depleted solution of the organic-dominant liquid phase.

3. The method of claim 1, wherein forming a treatment stream comprising a condensable material comprises forming the treatment stream to comprise one or more of a gas phase and a liquid phase of a hydrophilic condensable material.

4. The method of claim 3, wherein forming the treatment stream to comprise one or more of a gas phase and a liquid phase of a hydrophilic condensable material comprises forming the treatment stream to comprise one or more of gaseous dimethyl ether and liquid dimethyl ether.

5. The method of claim 3, wherein separating the condensable material of at least a portion of the aqueous liquid stream from the water of the at least a portion of the aqueous liquid stream comprises heating the at least a portion of the aqueous liquid stream to remove the hydrophilic condensable material as a gas from the water.

6. The method of claim 1, further comprising introducing the aqueous liquid stream to an additional amount of the solution to extract water from the additional amount of the solution and form a water-enriched stream comprising the condensable material from the aqueous liquid stream and water from the aqueous liquid stream and the additional amount of the solution, the aqueous liquid stream introduced to the additional amount of the solution prior to introducing the additional amount of the solution to an additional amount of the treatment stream.

7. The method of claim 6, further comprising separating the condensable material of at least a portion of the water-enriched stream from the water of the at least one portion of the aqueous liquid stream.

8. The method of claim 1, further comprising:
forming an additional treatment stream comprising additional condensable material;
introducing the additional treatment stream to another solution comprising the water of the solution, the solute of the solution, and at least one organic liquid to extract the organic liquid and form the another solution and form an organic-liquid-enriched stream comprising the additional condensable material and the organic liquid; and
separating the additional condensable material of at least one portion of the organic-liquid-enriched stream from the organic liquid of the at least one portion of the organic-liquid-enriched stream to at least partially reform the additional treatment stream and form an organic liquid product stream comprising the organic liquid.

9. The method of claim 8, wherein forming an additional treatment stream comprising additional condensable material comprises forming the additional treatment stream to consist essentially of a liquid phase of the additional condensable material.

10. An aqueous solution treatment system, comprising:
a source of an aqueous solution comprising water and a solute;
a condensable material separation apparatus configured to produce a treatment stream comprising a condensable material; and a contactor apparatus in fluid communication with the source of the aqueous solution and the condensable material separation apparatus and configured to interact the aqueous solution and the treatment stream with one another to fractionally precipitate the solute out of the aqueous solution and form a solids stream comprising the solute and one or more solute-depleted aqueous liquid streams comprising at least one solution of the water and the condensable material.

11. The aqueous solution treatment system of claim 10, wherein the condensable material separation apparatus is configured and positioned to receive the one or more solute-depleted aqueous liquid streams from the contactor apparatus and modify one or more of a temperature, pressure, and material exposure of the one or more solute-depleted aqueous liquid streams to at least partially reform the treatment stream.

12. The aqueous solution treatment system of claim 11, wherein the condensable material separation apparatus comprises one or more of at least one heat energy recovery device and at least one pressure energy recovery device.

13. The aqueous solution treatment system of claim 10, further comprising a fluid interaction apparatus configured and positioned to receive and interact one or more portions of the aqueous solution and at least one of the one or more solute-depleted, aqueous liquid streams to remove water from the one or more portions of the aqueous solution through liquid extraction driven by the condensable material.

14. The aqueous solution treatment system of claim 10, further comprising:
another condensable material separation apparatus configured to produce another treatment stream comprising an additional condensable material; and
an interaction apparatus configured and positioned to receive and interact the additional condensable material and the aqueous solution to remove an organic liquid from the aqueous solution through liquid extraction driven by the additional condensable material.

15. A method of treating an aqueous solution, comprising:
forming a first treatment stream comprising condensable material;
forming a second treatment stream comprising additional condensable material;
introducing the first treatment stream to an aqueous solution comprising water, an organic liquid, and a dissolved solid to form a first liquid stream comprising the organic liquid and the condensable material and a second liquid stream comprising the water and the dissolved solid;
separating the condensable material of the first liquid stream from the organic liquid of the first liquid stream to at least partially reform the first treatment stream and form a first liquid product stream comprising the organic liquid;
introducing the second treatment stream to the second liquid stream to fractionally precipitate the dissolved solid out of solution and form a solids stream comprising precipitated solid and a third liquid stream comprising the water and the additional condensable material; and
separating the additional condensable material of the third liquid stream from the water of the third liquid stream to at least partially reform the second treatment stream and form a second liquid product stream comprising the water.

16. The method of claim 15, further comprising selecting the condensable material and the additional condensable material to be the same as one another.

17. The method of claim 15, further comprising selecting the condensable material and the additional condensable material to be different than the second additional condensable material.

18. The method of claim 15, wherein:
forming the first treatment stream comprises forming the first treatment stream to comprise a gaseous phase of the condensable material; and
forming the second treatment stream comprises forming the second treatment stream to comprise a gaseous phase of the condensable material.

19. The method of claim 15, wherein:
forming the first treatment stream comprises forming the first treatment stream to comprise a liquid phase of the condensable material; and
forming the second treatment stream comprises forming the second treatment stream to comprise a liquid phase of the condensable material.

20. An aqueous solution treatment system, comprising:
a source of an aqueous solution comprising a water, an organic liquid, and a dissolved solid;
a first condensable material separation apparatus configured to produce a first treatment stream comprising condensable material;
a first contactor apparatus in fluid communication with the source of the aqueous solution and the first condensable material separation apparatus and configured to interact the aqueous solution and the first treatment stream with one another to form a first liquid stream comprising the organic liquid and the condensable material and a second liquid stream comprising the water and the dissolved solid;
a second condensable material separation apparatus configured to produce a second treatment stream comprising additional condensable material; and
a second contactor apparatus in fluid communication with the first contactor apparatus and the second condensable material separation apparatus and configured to interact the second liquid stream and the second treatment stream with one another to fractionally precipitate the dissolved solid out of solution and form a solids stream containing the precipitated dissolved solid and a third liquid stream comprising the water.

* * * * *

UNITED STATES PATENT AND TRADEMARK OFFICE
CERTIFICATE OF CORRECTION

| | | |
|---|---|---|
| PATENT NO. | : 11,261,111 B2 | Page 1 of 1 |
| APPLICATION NO. | : 17/040271 | |
| DATED | : March 1, 2022 | |
| INVENTOR(S) | : Wilson et al. | |

It is certified that error appears in the above-identified patent and that said Letters Patent is hereby corrected as shown below:

In the Claims

Claim 17, Column 27, Line 6, change "the second additional" to --the additional--

Signed and Sealed this
Nineteenth Day of April, 2022

Katherine Kelly Vidal
*Director of the United States Patent and Trademark Office*